(12) United States Patent
Kinnaird et al.

(10) Patent No.: US 10,767,529 B2
(45) Date of Patent: Sep. 8, 2020

(54) AUTOMOTIVE EXHAUST AFTERTREATMENT SYSTEM HAVING ONBOARD AMMONIA REACTOR WITH HEATED DOSER

(71) Applicant: Faurecia Emissions Control Technologies, USA, LLC, Columbus, IN (US)

(72) Inventors: Edward Kinnaird, Columbus, IN (US); John Rohde, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 9 days.

(21) Appl. No.: 16/184,534

(22) Filed: Nov. 8, 2018

(65) Prior Publication Data

US 2020/0149452 A1    May 14, 2020

(51) Int. Cl.
*F01N 3/20*    (2006.01)
*B01D 53/94*   (2006.01)

(52) U.S. Cl.
CPC ....... *F01N 3/2066* (2013.01); *B01D 53/9431* (2013.01); *F01N 3/2006* (2013.01); *F01N 2610/02* (2013.01); *F01N 2610/10* (2013.01); *F01N 2610/1453* (2013.01)

(58) Field of Classification Search
CPC ................. F01N 3/2066; F01N 3/2006; F01N 2610/1453; F01N 2610/02; F01N 2610/10; B01D 53/9431
See application file for complete search history.

(56) References Cited

U.S. PATENT DOCUMENTS

| | | |
|---|---|---|
| 4,486,270 A | 12/1984 | Kaasenbrood |
| 5,240,688 A | 8/1993 | Von Harpe |
| 5,827,490 A | 10/1998 | Jones |
| 6,077,491 A | 6/2000 | Cooper |
| 7,449,162 B2 | 11/2008 | Schaller |
| 7,595,034 B2 | 9/2009 | Nissinen |
| 8,518,354 B2 | 8/2013 | Ayyappan |
| 9,598,977 B2 | 3/2017 | Meyer |

(Continued)

FOREIGN PATENT DOCUMENTS

| | | |
|---|---|---|
| CH | 707551 | 8/2014 |
| CN | 104265422 | 1/2015 |

(Continued)

OTHER PUBLICATIONS

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Brandon D Lee
(74) *Attorney, Agent, or Firm* — Barnes & Thornburg LLP

(57) ABSTRACT

An automotive exhaust aftertreatment system includes an onboard ammonium carbamate reactor. The onboard ammonium carbamate reactor is coupled to a diesel emission fluid reservoir also included in the system and is configured to generate aqueous ammonium carbamate solution from diesel emission fluid. A doser configured to inject the generated aqueous ammonium carbamate solution has integrated heating.

10 Claims, 5 Drawing Sheets

(56) References Cited

U.S. PATENT DOCUMENTS

| | | |
|---|---|---|
| 9,771,850 B2 | 9/2017 | Henry |
| 2009/0031713 A1 | 2/2009 | Suzuki |
| 2013/0259755 A1* | 10/2013 | Kim .................. B01D 53/92 422/111 |
| 2014/0363358 A1 | 12/2014 | Udd |
| 2016/0061083 A1 | 3/2016 | Pramas |
| 2017/0122169 A1* | 5/2017 | Ettireddy .............. F01N 3/2066 |
| 2017/0204762 A1 | 7/2017 | Kotrba |

FOREIGN PATENT DOCUMENTS

| | | |
|---|---|---|
| DE | 102017101310 | 8/2017 |
| EP | 2543837 | 1/2013 |
| EP | 2870331 | 5/2015 |
| EP | 3330222 | 6/2018 |
| EP | 3581773 | 12/2019 |
| GB | 2552040 | 1/2018 |
| GB | 2562178 | 11/2018 |
| JP | 2015078643 | 4/2015 |
| KR | 20170013687 | 2/2017 |
| WO | 199956858 | 11/1999 |
| WO | 2006087553 | 8/2006 |
| WO | 2008077587 | 7/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages.

Extended European Search Report for European Appl. No. 19207953.1, dated Mar. 13, 2020, 7 pages.

* cited by examiner

AUTOMOTIVE EXHAUST AFTERTREATMENT SYSTEM HAVING ONBOARD AMMONIA REACTOR WITH HEATED DOSER

BACKGROUND

The present disclosure relates to exhaust aftertreatment systems for automotive applications, and particularly to the incorporation of onboard ammonia creation to support direct injection into an exhaust gas stream.

SUMMARY

An automotive exhaust aftertreatment system including an onboard ammonia reactor is described in this paper. The aftertreatment system is configured to mix both agent diesel emission fluid and aqueous ammonium carbamate solution provided by the ammonia reactor as reducing agents with exhaust gas moving through the system. The mixing of these reducing agents with exhaust gas is designed to cause a chemical reaction and reduce Nitrous Oxides (NOx) in the exhaust gas.

In illustrative embodiments, the system also includes a hybrid heating system integrated with a doser configured to discharge controlled amounts of aqueous ammonium carbamate solution into an exhaust stream moving through the aftertreatment system. In particular, the hybrid heating system includes a passive heat exchanger driven by engine heat carried by the exhaust gas and an active heating element driven by electrical power. Notably, the disclosed passive heat exchanger draws heat from downstream of a catalyst included in the system so as not to reduce exhaust gas temperature before desired chemical reactions occur between the reducing agents and NOx in the exhaust gas. A controller selectively adjusts operation of the passive heat exchanger and the active heat exchanger to optimize operation of the hybrid heating system and avoid aqueous ammonium carbamate solution being discharged below preselected threshold temperatures.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is perspective view of a diesel engine semi-truck with an automotive exhaust aftertreatment system including a catalytic NOx reduction unit, an ammonia creation and conversion unit, and a hybrid heating system configured to manage temperatures within the automotive exhaust aftertreatment system;

FIG. 2 is a diagrammic view of the automotive exhaust aftertreatment system showing that the ammonia creation and conversion unit includes an ammonium carbamate reactor and an ammonium carbamate reservoir and showing that the hybrid heating system includes active and passive heating element, a heating system controller configured to selectively modulate the heat from the hybrid heating system to control the temperature within the automotive exhaust aftertreatment system, and sensors configured to measure the temperature and tank levels within the exhaust aftertreatment system;

DETAILED DESCRIPTION

Figure 1:
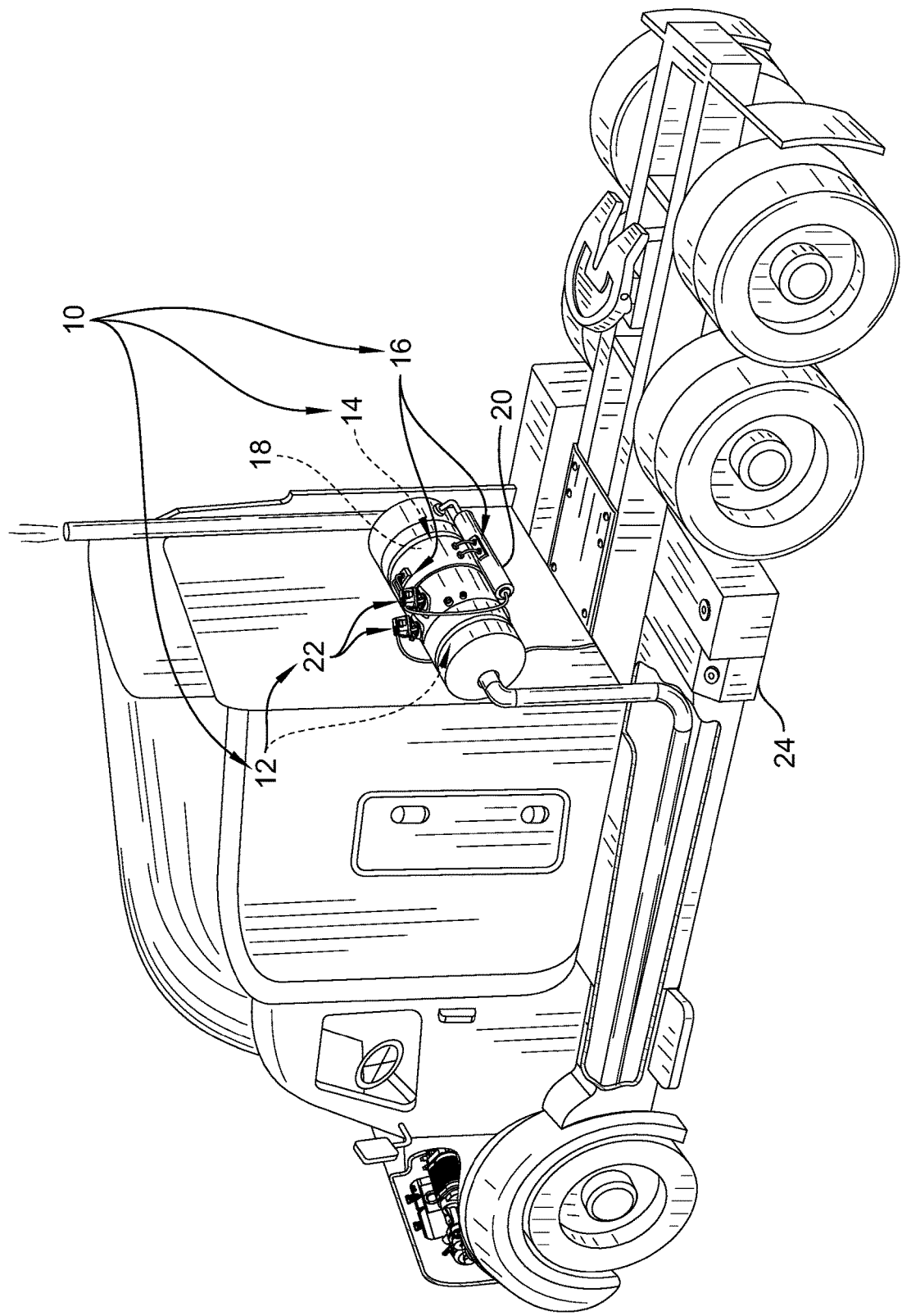

For the purposes of promoting an understanding of the principles of the disclosure, reference will now be made to a number of illustrative embodiments illustrated in the drawings and specific language will be used to describe the same.

An illustrative diesel engine semi-truck is shown in FIG. 1 having an automotive exhaust aftertreatment system 10 including catalytic NOx reduction unit 12, an ammonia creation and conversion unit 14, and a hybrid heating system 16. The catalytic NOx reduction unit 12 is configured inject either diesel emission fluid or aqueous ammonium carbamate solution with engine exhaust to convert the engine exhaust, specifically nitrogen oxides, into nitrogen and water vapor or carbon dioxides which can be released into the surrounding air. The ammonia creation and conversion unit 14 is configured to convert the diesel emission fluid into aqueous ammonium carbamate solution. The aqueous ammonium carbamate solution from the ammonia creation and conversion unit 14 is injected in the exhaust flow before the catalytic NOx reduction unit 12 to reduce the nitrogen oxides at low temperatures such as during engine start up.

Figure 2:
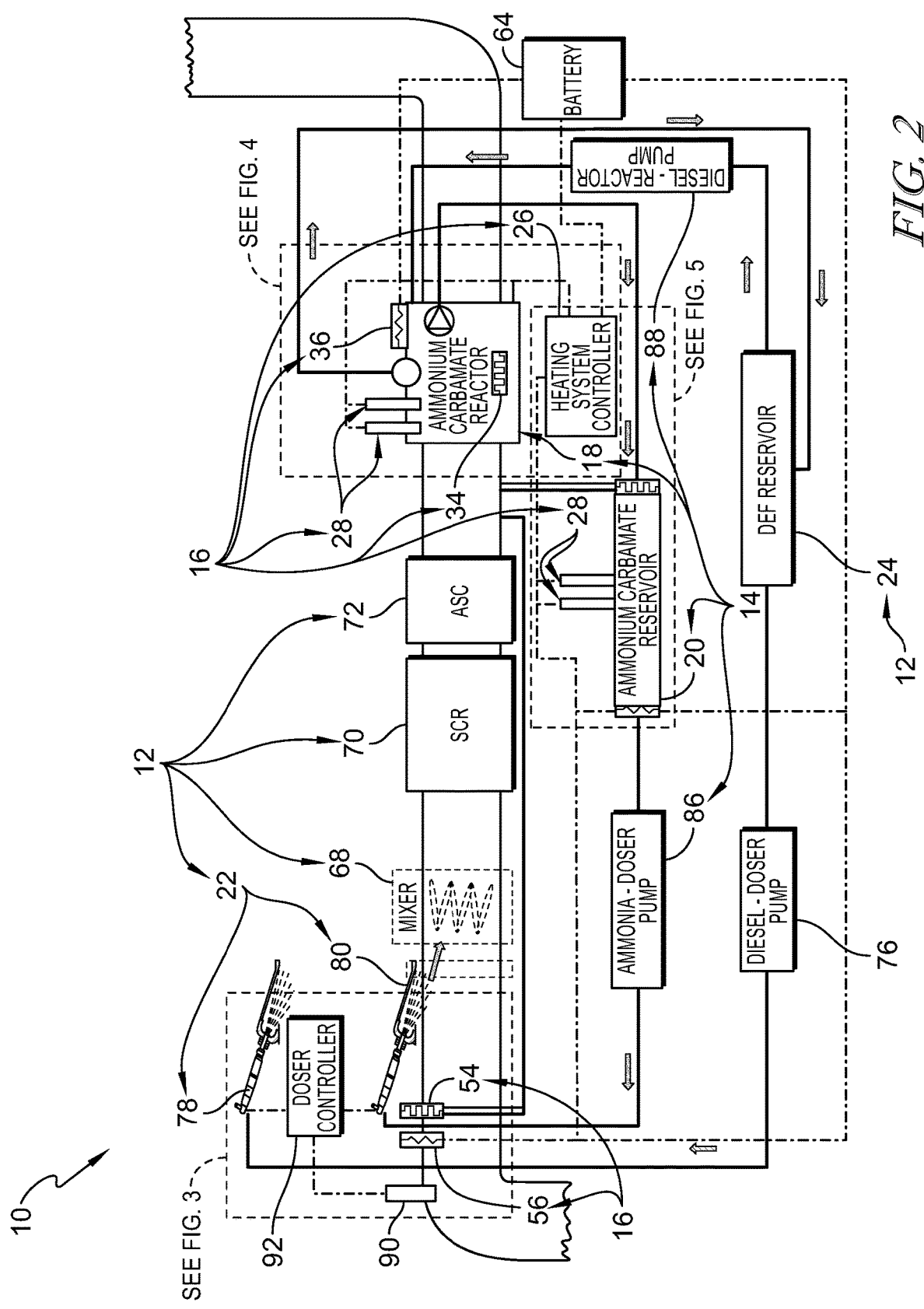
Figure 3:
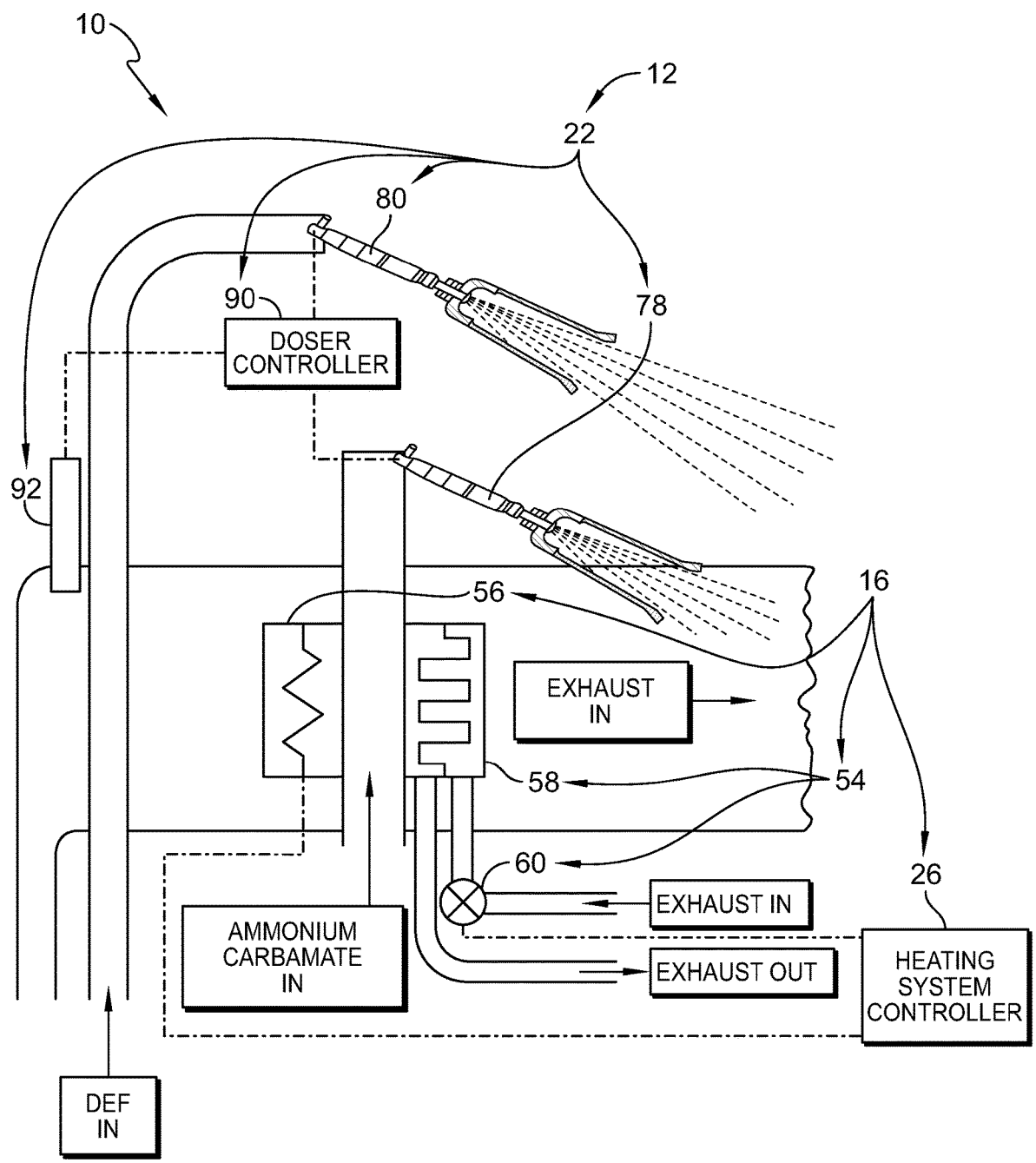
FIG. 3 is a detail diagrammatic view of a dosing system included in the automotive exhaust aftertreatment system of FIG. 2 showing that an active doser heating element and a passive doser heating element are coupled to the dosing system.

The catalytic NOx reduction unit 12 includes a dosing system 22 as shown in FIGS. 2 and 3. The dosing system 22 is coupled to an outer casing of the automotive exhaust aftertreatment system 10 and is configured to discharge either aqueous ammonium carbamate solution or diesel emission fluid (DEF) into the engine exhaust flow as suggested in FIG. 2. In the illustrative embodiment, the hybrid heating system 16 is integrated into the dosing system 22 and manages temperatures within the dosing system 22.

The dosing system 22 includes a first doser 78, a NOx sensor 90, and a doser controller 92 as shown in FIGS. 2 and 3. The first doser 78 is configured to discharge controlled amounts of aqueous ammonium carbamate solution into an exhaust stream moving through the exhaust gas aftertreatment system 10. The NOx sensor 90 is configured to detect the amount of NOx carried in an exhaust stream entering the exhaust aftertreatment system 10. The doser controller 92 is configured to inject aqueous ammonium carbamate solution at a predetermined reaction flow rate into the exhaust stream based at least in part on the amount of NOx detected. The doser controller 92 is further configured to inject aqueous ammonium carbamate solution at a relief flow rate into the exhaust stream greater than the predetermined reaction flow rate when the amount of aqueous ammonium carbamate solution in an ammonium carbamate reservoir 18 included in the ammonia creation and conversion unit 14 is greater than a predetermined amount.

In the illustrative embodiment, the dosing system further includes a second doser 80 as shown in FIGS. 2 and 3. The second doser 80 is configured to discharge controlled amounts of diesel emission fluid into an exhaust stream moving through the exhaust gas aftertreatment system 10. In some embodiments, the dosing system 22 may only include one doser that is configured to selectively discharge controlled amounts of either aqueous ammonium carbamate solution or diesel emission fluid. If only one doser is included in the system 10, then a cleaning system may need to be implemented to ensure no remnants of the previous fluid are present in the doser before the other fluid is discharged by the doser. In some embodiments, the first and second dosers 78, 80 may be integrated into a single unit.

The ammonia creation and conversion unit 14 includes an ammonium carbamate reactor 18 and an ammonium carbamate reservoir 20. The ammonium carbamate reactor 18 is coupled to a diesel emission fluid reservoir 24 included in the catalytic NOx reduction unit 12 and is configured to generate aqueous ammonium carbamate solution from diesel emission fluid. The ammonium carbamate reservoir 20 is coupled to the ammonium carbamate reactor 18 and is used for storing generated aqueous ammonium carbamate solution from the ammonium carbamate reactor 18. It is contemplated that other aqueous ammonia-containing solutions could be generated within the reactor 18 and used in the unit 14. These other aqueous ammonia solutions may be derived from other primary fluids/solids supplied to the unit 14.

The hybrid heating system 16 may be further configured to manage temperatures within other parts of the automotive exhaust aftertreatment system 10 as suggested in FIGS. 2-5. Specifically, the hybrid heating system 16 may be configured to manage temperatures within an ammonium carbamate reactor 18 and an ammonium carbamate reservoir 20 included in the ammonia creation and conversion unit 14.

The hybrid heating system 16 includes passive and active heating elements, a heating system controller 26, and a plurality of sensors 28 as shown in FIGS. 2-5. The heating system controller 26 is configured to selectively apply heat from the active heating elements to manage the temperature within the system 10. The heating system controller 26 is also configured to selectively modulate heat from the passive heating elements to control the temperature within the system 10. The heating system controller 24 is configured to selectively apply heat from the active heating elements and selectively modulate heat from passive heating elements based on information such as temperature and tank level measured by the plurality of sensors 28.

In the illustrative embodiment, the plurality of sensors 28 includes reactor temperature sensor 30, a reservoir temperature sensor 31, a reactor level sensor 32, and a reservoir level sensor as shown in FIGS. 2 and 3. The reactor temperature sensor is coupled to the ammonium carbamate reactor 18 and is configured to measure the temperature of the contents in the ammonium carbamate reactor 18. The reactor level sensor 32 is coupled to the ammonium carbamate reactor 18 and configured to measure the amount of fluid in the reactor 18. Additionally, reservoir temperature sensor 31 and the reservoir level sensor 33 are coupled to the ammonium carbamate reservoir 20. The reservoir temperature sensor 31 measures the temperature of the contents stored in the reservoir 20. The reservoir level sensor 33 determines the levels of aqueous ammonium carbamate solution stored in the reservoir 20. The plurality of sensors 28 are in communication with the heating system controller 26.

The hybrid heating system 16 includes a passive doser heat exchanger 54 and an active doser heating element 56 as shown in FIG. 3. The passive doser heat exchanger 54 is configured to withdraw heat from exhaust gasses passing through the exhaust aftertreatment system 10 and heat passageways through the dosers 78. The active doser heating element 56 is configured to produce heat from electrical energy supplied to the heating system 16 and heat passageways through the dosing system 22. The heating system controller 26 is configured to selectively apply heat from the active doser heating element 56 as to manage the temperature of aqueous ammonium carbamate solution moving in passageways through the dosing system 22. The heating system controller 26 is also configured to selectively modulate heat from the passive doser heat exchanger 54 as to manage the temperature of aqueous ammonium carbamate solution moving in passageways through the dosing system 22. Additionally, the heating system controller 26 is configured to selectively apply heat from the active doser heating element 6 and to selectively modulate heat from the passive doser heat exchanger 54 so as to manage the temperature of aqueous ammonium carbamate solution discharged from the doser at or above 60 degrees Celsius. In one embodiment, the heating system controller 26 is configured to selectively apply heat from the active doser heating element 6 and to selectively modulate heat from the passive doser heat exchanger 54 so as to manage the temperature of the solution discharged from the doser between about 60 degrees Celsius and about 200 degrees Celsius.

The passive doser heat exchanger 54 includes a passive doser heat exchanger channel 58 and a passive doser heat exchanger valve 60 as shown in FIG. 3. The passive doser heat exchanger channel 58 is configured to withdraw the heat from the exhaust entering the passive doser heat exchanger 54. The valve 60 is arranged at an inlet to the passive doser heat exchanger channel 58 and is configured to modulate the exhaust flow entering the passive doser heat exchanger 54 by changing between an open position in which the exhaust flow is permitted to enter the passive doser heat exchanger channel 58 and a closed position in which the exhaust flow is prevented from entering the passive doser heat exchanger channel 58. The valve 60 is configured to be in communication with the heating system controller 26 which changes the valve 60 between the open and closed positions.

Figure 4:
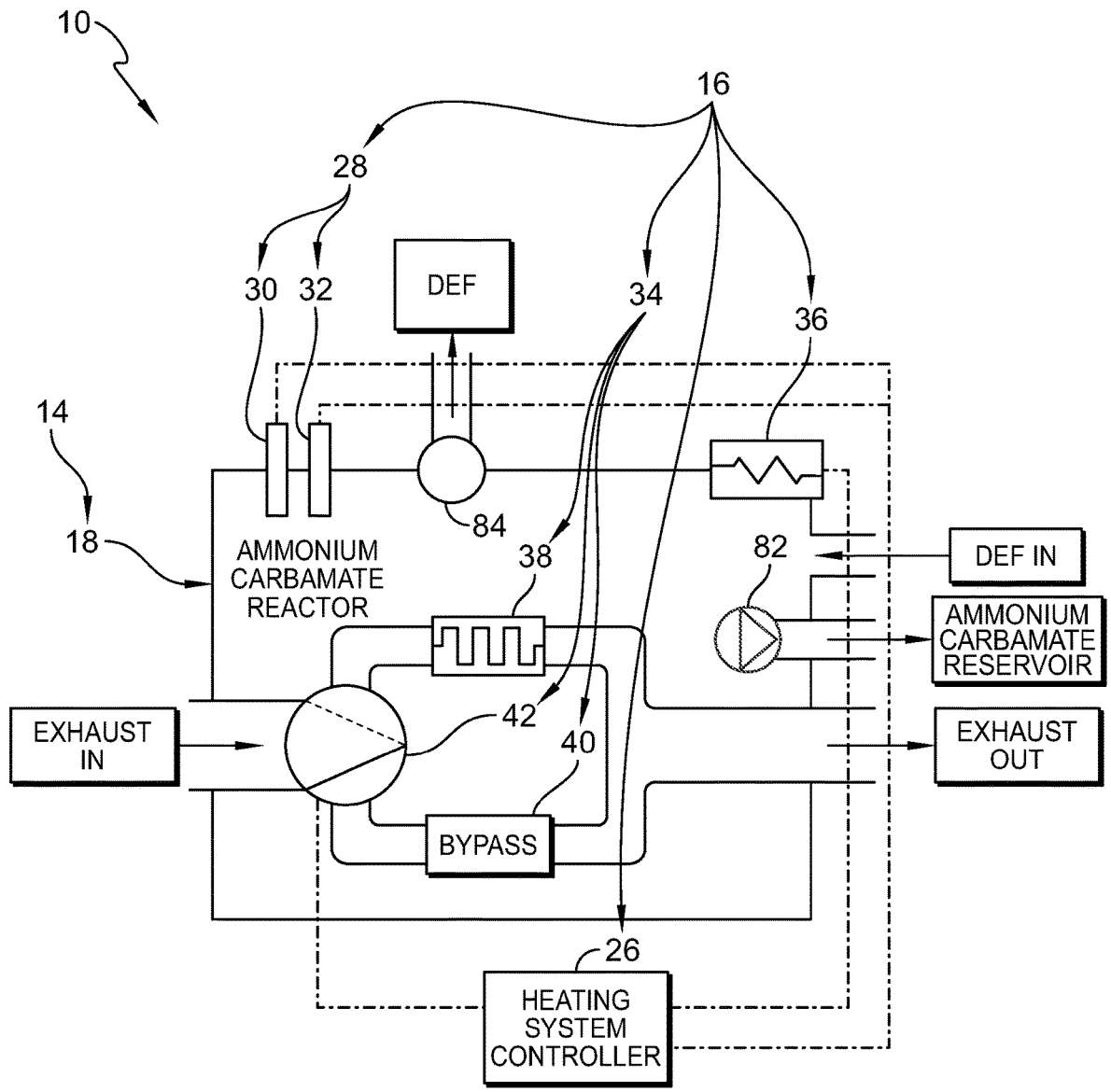
FIG. 4 is a detail diagrammatic view of the ammonium carbamate reactor of FIG. 2 showing an active reactor heating element and a passive reactor heat exchanger of the hybrid heating system are both coupled to the ammonium carbamate reactor and showing the passive reactor heat exchanger is configured to withdraw heat from exhaust gasses passing through the exhaust aftertreatment system.

The hybrid heating system 16 may also include a passive reactor heat exchanger 34 and an active reactor heating element 36 as shown in FIG. 4. The passive reactor heat exchanger 34 is configured to withdraw heat from exhaust gasses passing through the exhaust aftertreatment system 10 and heat contents of the ammonium carbamate reactor 18. The active reactor heating element 36 is configured to produce heat from electrical energy supplied to the heating system 16 and heat contents of the ammonium carbamate reactor 18. The heating system controller 26 is electrically coupled to both active and passive heating elements 34, 36. The heating system controller 26 is also configured to selectively apply heat from the active reactor heating element 36 to manage the temperature within the ammonium carbamate reactor 18. The heating system controller 26 is also configured to selectively modulate heat from the passive reactor heat exchanger 34 to control the temperature within the ammonium carbamate reactor 18.

The passive reactor heat exchanger includes a passive reactor heat exchanger channel 38, a reactor bypass duct 40, and a passive reactor heat exchanger valve 42 as shown in FIG. 4. The passive reactor heat exchanger channel 38 is configured to withdraw the heat from the exhaust entering the passive reactor heat exchanger 34. The reactor bypass duct 40 is configured to allow exhaust entering the passive reactor heat exchanger 34 to bypass the passive reactor heat exchanger channel 38. The valve 42 is configured to extend between and interconnect the passive reactor heat exchanger channel 38 and the bypass duct 40 and modulate the exhaust flow entering the passive heat exchanger 34 between the passive reactor heat exchanger channel 38 and the bypass duct 40. The valve 42 modulates the exhaust flow entering the passive reactor heat exchanger 34 by changing between an open position in which the exhaust flow is directed toward the passive reactor heat exchanger channel 38 and a closed position in which the exhaust flow is directed toward the reactor bypass duct 40 and bypasses the channel 38. The valve 42 is configured to be in communication with the heating system controller 26 which changes the valve 42 between the open and closed positions.

Figure 5:
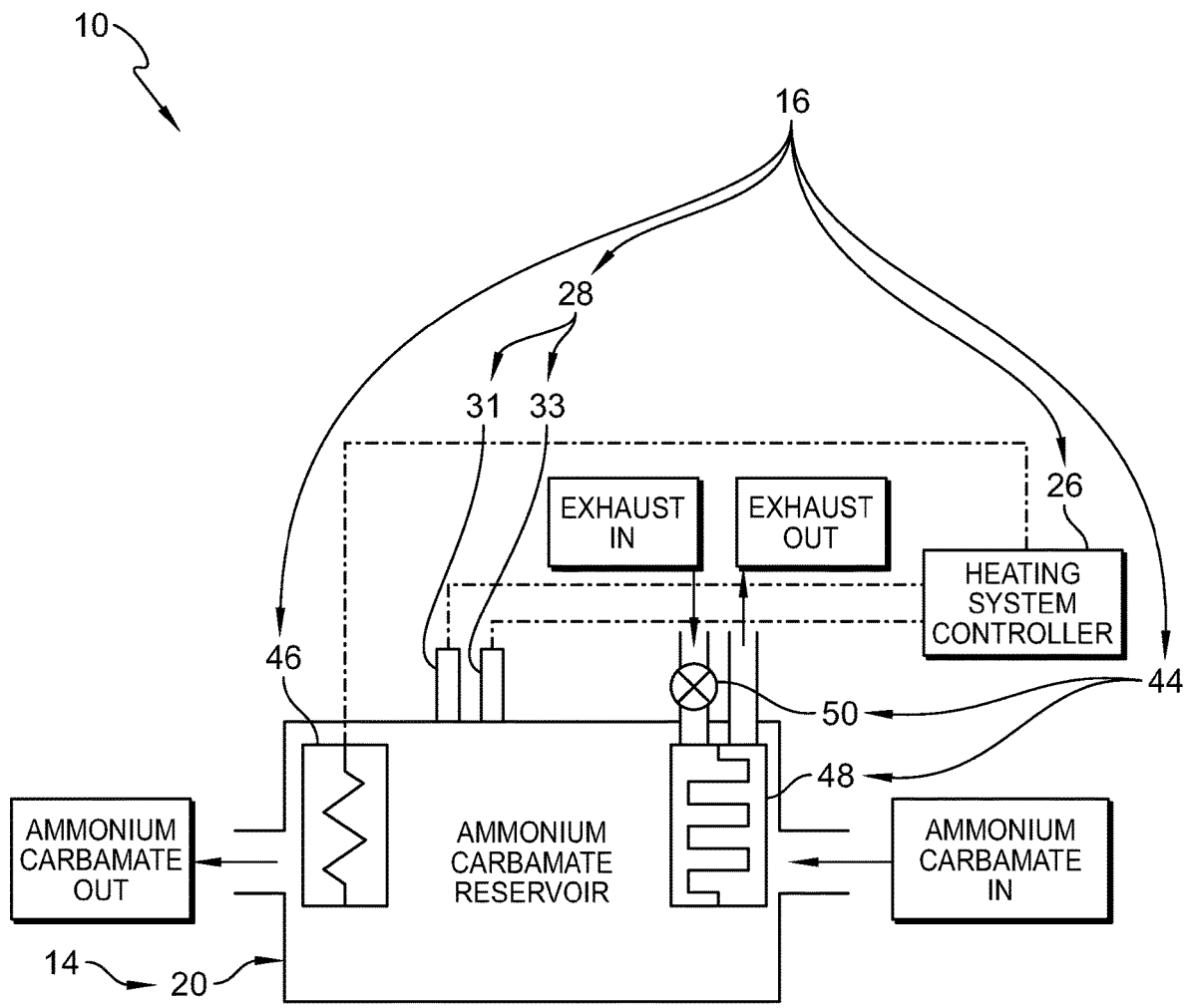
FIG. 5 is a detail diagrammatic view of the ammonium carbamate reservoir of FIG. 2 showing an active reservoir heating element and a passive reservoir heat exchanger of the hybrid heating system are both coupled to the ammonium carbamate reservoir and showing the passive reservoir heat exchanger is configured to withdraw heat from exhaust gasses passing through the exhaust aftertreatment system.

The hybrid heating system 16 also includes a passive reservoir heat exchanger 44 and an active reservoir heating element 46 as shown in FIG. 5. The passive reservoir heat exchanger 44 is configured to withdraw heat from exhaust gasses passing through the exhaust aftertreatment system 10 and heat contents of the ammonium carbamate reservoir 20. The active reservoir heating element 46 is configured to produce heat from electrical energy supplied to the heating system 16 and heat contents of the ammonium carbamate reservoir 20. The heating system controller 26 is configured to selectively apply heat from the active reservoir heating element 46 to manage the temperature within the ammonium carbamate reservoir 20 to maintain equilibrium of stored aqueous ammonium carbamate soltuion. The heating system controller 26 is also configured to selectively modulate heat from the passive reservoir heat exchanger 44 to control the temperature within the ammonium carbamate reservoir 20 to maintain equilibrium of stored aqueous ammonium carbamate soltuion.

The passive reservoir heat exchanger 44 includes a passive reservoir heat exchanger channel 48 and a passive reservoir heat exchanger valve 50 as shown in FIG. 5. The passive reservoir heat exchanger channel 48 is configured to withdraw the heat from the exhaust entering the passive reservoir heat exchanger 44. The valve 50 is arranged at an inlet to the passive reservoir heat exchanger channel 48 and is configured to modulate the exhaust flow entering the passive reservoir heat exchanger 44 by changing between an open position in which the exhaust flow is permitted to enter the passive reservoir heat exchanger channel 48 and a closed position in which the exhaust flow is prevented from entering the passive reservoir heat exchanger channel 48. The valve 50 is configured to be in communication with the heating system controller 26 which changes the valve 50 between the open and closed positions.

The heating system controller 26 is configured to selectively apply heat from the active heating elements 36, 46, 56 and selectively modulate the heat from the passive heat exchangers 34, 44, 54 based on several factors. For example, the heating system controller 26 selectively applies heat from the active reactor heating element 36 based on information associated with tank level within the ammonium carbamate reservoir 20 received from sensors 28 in communication with the heating system controller 26. The heating system controller 26 applies heat from the active reactor heating element 36 when the contents of the ammonium carbamate reservoir 20 is running low and the passive reactor heat exchanger 34 is not generating enough heat to produce more aqueous ammonium carbamate solution.

The heating system controller 26 may also selectively apply heat from the active reactor heating element 36 based on information associated with the temperature within the reactor 18. The heating system controller 26 applies heat from the heating element 36 when the passive heating element 34 does not supply enough heat to react the contents of the reactor 18 to produce aqueous ammonium carbamate solution.

In other embodiments, the heating system controller 26 selectively applies heat from the active reservoir heating element 46 based on information associated with the temperature within the ammonium carbamate reservoir 20. The heating system controller 26 applies heat from the active reservoir heating element 46 when the temperature of the reservoir 20 is getting below a desired temperature as to maintain the equilibrium of the aqueous ammonium carbamate solution stored in the reservoir 20. If the passive reservoir heat exchanger 44 is not supplying enough heat to maintain the reservoir 20 at the desired temperature, the aqueous ammonium carbamate solution may form a precipitant or a solid. The heating system controller 26 applies head from the active reservoir heating element 46 in an instance where the temperature is low enough the precipitant or the solid would form.

In another embodiment, the heating system controller 26 applies heat from the active doser heating element 56 to maintain the desired temperature within the dosing system 22. If the desired temperature is not maintained within the dosing system 22, then the percipient or the solid may form in the dosing system 22 causing blockage.

The heating system controller 26 also selectively modulates the heat from the passive reactor heat exchanger 34 to control the temperature within the ammonium carbamate reactor 18. The heating system controller 26 modulates the heat from the passive reactor heat exchanger 34 when the temperature within the reactor 18 rises above the desired temperature. The heating system controller 26 changes the valve 42 from the open position to the closed position to allow the exhaust to enter the bypass duct 40 and bypass the channel 38 which cools the contents of the reactor 18.

The heating system controller 26 also selectively modulates the heat from the passive reservoir heat exchanger 44 to control the temperature within the ammonium carbamate reservoir 20. The heating system controller 26 modulates the heat from the passive reservoir heat exchanger 44 when the temperature within the reservoir rises above the desired temperature. The heating system controller 26 changes the valve 50 from the open position to the closed position to block the exhaust from entering the passive reservoir heat exchanger channel 48. With the exhaust blocked from entering the passive reservoir heat exchanger channel 48, the contents of the reservoir 20 cools to the desired temperature.

Lastly, the heating system controller 26 also modulates the heat from the passive doser heat exchanger 54 when the temperature within the dosing system rises above the desire temperature. The heating system controller 26 changes the valve 60 from the open position to the closed position to block the exhaust from entering the passive doser heat exchanger channel 58. With the exhaust blocked from entering the passive doser heat exchanger channel 58, the contents of the reservoir 20 cools to the desired temperature.

In the illustrative embodiment, the hybrid heating system 16 also includes a battery 64 as shown in FIG. 2. The battery 64 is coupled to the active reactor heating element 36 and provides a power source for the active reactor heating element 36. The battery 64 may also be coupled to the active reservoir heating element 46 and the active doser heating element 56 and provides the power source for the active reservoir heating element 46 and the active doser heating element 56. In some embodiments, the hybrid heating system 16 instead includes at least one of a solar panel or a wind turbine that provides the power source for the active heating elements 36, 46, 56.

In the illustrative embodiment, the automotive exhaust after treatment system 10 further includes a catalyst 66. The catalyst 66 is mounted within the system 10. The passive reactor heat exchanger 34 withdraws heat from the exhaust gases downstream of the catalyst 66 so as not to reduce exhaust gas temperatures before interaction with the catalyst 66.

Turning again to the catalytic NOx reduction unit 12 shown in FIG. 2, the catalytic NOx reduction unit 12 further includes a mixer 68, a selective catalytic reduction system 70, and an ammonia slip catalyst system 72 as shown in FIG. 2. The mixer 68 is mounted within the system 10 and is configured to mix the engine exhaust with the fluid injected by the dosing system 22. The selective catalytic reduction system 70 is configured to selectively convert the exhaust-diesel emission fluid mixture comprising nitrogen oxides with the aid of the catalyst 66 into either nitrogen and water vapor or carbon dioxide. The reaction product is nitrogen and water vapor when diesel emission fluid is mixed with the exhaust and the reaction product is carbon dioxide when ammonia is mixed with the exhaust. The ammonia slip catalyst system 72 is configured to further convert any partially oxidized nitrogen oxides exiting the selective catalytic reduction system 70.

The catalytic NOx reduction unit 12 shown in FIG. 2 further includes a diesel emission fluid reservoir 24 and a diesel-doser pump 76 as shown in FIG. 2. The diesel emission fluid reservoir 24 is in communication with the ammonium carbamate reactor 18 and the dosing system 22. The diesel-doser pump 76 is coupled to the diesel emission fluid reservoir 24 and is configured to pump diesel emission fluid to the dosing system 22.

In the illustrative embodiment, the ammonium carbamate reactor 18 included in the ammonia creation and conversion unit 14 also includes a check valve 82 and a relief valve 84 as shown in FIGS. 2 and 4. The check valve is in communication with the ammonium carbamate reservoir 20 and is configured to allow the aqueous ammonium carbamate solution generated by the reactor 18 to exit the reactor 18, but prevent any fluid from re-entering the reactor 18. The relief valve 84 is in communication with the diesel emission fluid reservoir 24 and is configure to allow the removal of diesel emission fluid from the reactor 18 if the pressure within the ammonium carbamate reactor 18 exceeds a desired pressure.

The ammonia creation and conversion unit 14 further includes a ammonium-doser pump 86 and a diesel-reactor pump 88 as shown in FIG. 2. The ammonium-doser pump 86 is coupled to the ammonium carbamate reservoir 20 and is configured to pump aqueous ammonium carbamate solution to the second doser 80. The diesel-reactor pump 88 is coupled to the diesel emission fluid reservoir 24 and is configured to pump diesel emission fluid to the ammonium carbamate reactor 18. In some embodiments, only one pump may be included in the system 10 and in communication with the ammonium carbamate reactor 18, the ammonium carbamate reservoir 20, the diesel emission fluid reservoir 24, and the dosing system 22 to pump the desired contents to the desired location.

The present disclosure introduces a method for reducing NOx emissions at low temperatures, such as engine start up, or low load engine duty cycles at temperatures less than 180 degrees Celsius by adding an ammonium carbamate solution to engine exhaust entering an exhaust aftertreatment system. However, the ammonium carbamate solution can precipitate at temperatures less than 20 degrees Celsius and cause undesirable effects in the exhaust aftertreatment system. In some embodiments, a doser may be added to the exhaust aftertreatment system to inject or dose the ammonium carbamate solution into the engine exhaust flow. The doser may be heated by a heating system to ensure the ammonium carbamate solution has a temperature that remains above 20 degrees Celsius which prevents the precipitant from forming.

In some embodiments, the exhaust aftertreatment system includes a diesel emission fluid tank, an ammonium carbamate reactor, pumps, valves, a controller, and an ammonium carbamate tank. The exhaust aftertreatment system may be used to meet the Ultra Low NOx emissions of 0.002 g hp-hr proposed for 2023 by the California Air Resources Board. In addition to commercial vehicle applications, the exhaust aftertreatment system 10 can be implemented in passenger car or high horse performance car markets. While the illustrative embodiment shows the system including a number of pumps, fewer or even a single pump may be included in the system to drive fluid flow without departing from the contemplated designs.

The present disclosure introduces using heated dosing for an ammonium carbamate reductant fluid. Ammonium carbamate works well as the NOx reductant at surface temperatures below 150 degrees Celsius. The heated doser or injector may be electrically heated or heated with exhaust. The heated doser reduces ammonium carbamate droplets even more and can aid in the mixing of the exhaust and the ammonium carbamate solution in a mixer of the exhaust aftertreatment system. The amount of aqueous ammonium carbamate solution injected by the heated doser depends on the amount of NOx to be reduced in the exhaust. The amount of aqueous ammonium carbamate solution added may be regulated by NOx sensors and a controller. The overall exhaust aftertreatment system would allow exhaust to meet the California Air Resources Board standards as well as the European and China future standards.

The following numbered clauses include embodiments that are contemplated and non-limiting:

Clause 1: An exhaust gas aftertreatment system for dosing reducing agent into an exhaust stream, the system comprising a diesel emission fluid reservoir, a reactor for generating an ammonia solution from diesel emission fluid in the diesel emission fluid reservoir, a doser configured to discharge controlled amounts of the ammonia solution into an exhaust stream moving through the exhaust gas aftertreatment system, and a heating system configured to manage temperatures within the ammonium carbamate reactor, the heating system including a passive doser heat exchanger configured to withdraw heat from exhaust gasses passing through the exhaust aftertreatment system and heat passageways through the doser, an active doser heating element configured to produce heat from electrical energy supplied to the heating system and heat passageways through the doser, and a heating system controller configured to selectively apply heat from the active doser heating element to manage the temperature of ammonia solution moving in passageways through the doser.

Clause 2: The system of any other suitable clause or combination of clauses, wherein the heating system controller is configured to selectively modulate heat from the passive doser heat exchanger to manage the temperature of the ammonia solution moving in passageways through the doser.

Clause 3: The system of any other suitable clause or combination of clauses, wherein the heating system controller is configured to selectively apply heat from the active doser heating element and to selectively modulate heat from the passive doser heat exchanger so as to manage the temperature of ammonia solution discharged from the doser above 60 degrees Celsius.

Clause 4: The system of any other suitable clause or combination of clauses, wherein the heating system controller is configured to selectively apply heat from the active doser heating element and to selectively modulate heat from the passive doser heat exchanger so as to manage the temperature of the ammonia solution discharged from the doser between about 60 degrees Celsius and about 200 degrees Celsius.

Clause 5: The system of any other suitable clause or combination of clauses, further comprising a catalyst mounted within the system. The passive doser heat exchanger configured to withdraw heat from exhaust gasses downstream of the catalyst so as not to reduce exhaust gas temperatures before interaction with the catalyst.

Clause 6: The system of any other suitable clause or combination of clauses, wherein the hybrid heating system includes a passive reactor heat exchanger configured to withdraw heat from exhaust gasses passing through the exhaust aftertreatment system and heat contents of the ammonium carbamate reactor, an active reactor heating element configured to produce heat from electrical energy supplied to the heating system and heat contents of the ammonium carbamate reactor, and a heating system controller configured to selectively apply heat from the active reactor heating element to manage the temperature within the ammonium carbamate reactor.

Clause 7: The system of any other suitable clause or combination of clauses, wherein the passive reactor heat exchanger withdraws heat from exhaust gasses downstream of the catalyst so as not to reduce exhaust gas temperatures before interaction with the catalyst.

Clause 8: The system of any other suitable clause or combination of clauses, further comprising a NOx sensor configured to detect the amount of NOx carried in an exhaust stream entering the exhaust aftertreatment system and a doser controller configured to inject ammonia solution at a predetermined reaction flow rate into the exhaust stream based at least in part on the amount of NOx detected.

Clause 9: The system of any other suitable clause or combination of clauses, further comprising an ammonium carbamate reservoir configured to store aqueous ammonium carbamate solution generated by the ammonium carbamate reactor and a reservoir level sensor configured to detect the amount of aqueous ammonium carbamate solution in the ammonium carbamate reservoir. The doser controller is configured to inject aqueous ammonium carbamate solution at a relief flow rate into the exhaust stream greater than the predetermined reaction flow rate when the amount of aqueous ammonium carbamate solution in the ammonium carbamate reservoir is greater than a predetermined amount.

Clause 10: The system of any other suitable clause or combination of clauses, wherein the hybrid heating system includes an active reservoir heating element configured to produce heat from electrical energy supplied to the heating system and heat contents of the ammonium carbamate reservoir, and/or wherein the heating system controller configured to selectively apply heat from the active reactor heating element to manage the temperature within the ammonium carbamate reservoir to maintain equilibrium of stored aqueous ammonium carbamate carbamate.

Clause 11: The system of any other suitable clause or combination of clauses, wherein the hybrid heating system includes a passive reservoir heat exchanger configured to withdraw heat from exhaust gasses passing through the exhaust aftertreatment system and heat contents of the ammonium carbamate reservoir, and/or wherein the heating system controller is configured to selectively modulate heat from the passive reservoir heat exchanger to control the temperature within the ammonium carbamate reservoir to maintain equilibrium of stored aqueous ammonium carbamate solution.

Clause 12. A vehicle comprising
a combustion engine configured to generate exhaust gases, and
an exhaust aftertreatment system configured to treat the exhaust gases, the exhaust aftertreatment system including
a diesel emission fluid reservoir,
a reactor for generating an ammonia solution from diesel emission fluid in the diesel emission fluid reservoir,
a doser configured to discharge controlled amounts of the ammonia solution into an exhaust stream moving through the exhaust gas aftertreatment system, and
a heating system configured to manage temperatures within the doser, the heating system including a passive doser heat exchanger configured to withdraw heat from exhaust gasses passing through the exhaust aftertreatment system and heat passageways through the doser, an active doser heating element configured to produce heat from electrical energy supplied to the heating system and heat passageways through the doser, and a heating system controller configured to selectively apply heat from the active doser heating element to manage the temperature of the ammonia solution moving in passageways through the doser.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An exhaust gas aftertreatment system for dosing reducing agent into an exhaust stream, the system comprising
a diesel emission fluid reservoir,
a reactor for generating an ammonia solution from diesel emission fluid in the diesel emission fluid reservoir,
a doser configured to discharge controlled amounts of the ammonia solution into an exhaust stream moving through the exhaust gas aftertreatment system,
a heating system configured to manage temperatures within the doser, the heating system including a passive doser heat exchanger configured to withdraw heat from exhaust gasses passing through the exhaust aftertreatment system and heat passageways through the doser, an active doser heating element configured to produce heat from electrical energy supplied to the heating system and heat passageways through the doser, and a heating system controller configured to selectively apply heat from the active doser heating element to manage the temperature of the ammonia solution moving in passageways through the doser, a sensor configured to detect a parameter associated with the amount of NOx carried in an exhaust stream entering the exhaust aftertreatment system, a doser controller configured to inject the ammonia solution at a predetermined reaction flow rate into the exhaust stream based at least in part on the amount of NOx detected, an ammonium carbamate reservoir configured to store aqueous ammonium carbamate generated by the ammonium carbamate reactor, and a reservoir level sensor configured to detect an amount of aqueous ammonium carbamate solution in the ammonium carbamate reservoir, wherein the doser controller is configured to inject aqueous ammonium carbamate solution at a relief flow rate into the exhaust stream greater than the predetermined reaction flow rate when the amount of aqueous ammonium carbamate solution in the ammonium carbamate reservoir is greater than a predetermined amount.

2. The system of claim 1, wherein the heating system controller is configured to selectively modulate heat from the passive doser heat exchanger to manage the temperature of aqueous ammonium carbamate solution moving in passageways through the doser.

3. The system of claim 2, wherein the heating system controller is configured to selectively apply heat from the active doser heating element and to selectively modulate heat from the passive doser heat exchanger so as to manage the temperature of the ammonia solution discharged from the doser above 60 degrees Celsius.

4. The system of claim 3, wherein the heating system controller is configured to selectively apply heat from the active doser heating element and to selectively modulate heat from the passive doser heat exchanger so as to manage the temperature of the ammonia solution discharged from the doser between about 60 degrees Celsius and about 200 degrees Celsius.

5. The system of claim 1, further comprising a catalyst mounted within the system, and wherein the passive doser heat exchanger withdraws heat from exhaust gasses downstream of the catalyst so as not to reduce exhaust gas temperatures before interaction with the catalyst.

6. The system of claim 5, wherein the heating system includes a passive reactor heat exchanger configured to withdraw heat from exhaust gasses passing through the exhaust aftertreatment system and heat contents of the reactor, an active reactor heating element configured to produce heat from electrical energy supplied to the heating system and heat contents of the reactor, and a heating system controller configured to selectively apply heat from the active reactor heating element to manage the temperature within the reactor.

7. The system of claim 6, wherein the passive reactor heat exchanger withdraws heat from exhaust gasses downstream of the catalyst so as not to reduce exhaust gas temperatures before interaction with the catalyst.

8. An exhaust gas aftertreatment system for dosing reducing agent into an exhaust stream, the system comprising
a diesel emission fluid reservoir,
a reactor for generating an ammonia solution from diesel emission fluid in the diesel emission fluid reservoir,
a doser configured to discharge controlled amounts of the ammonia solution into an exhaust stream moving through the exhaust gas aftertreatment system, and
a heating system configured to manage temperatures within the doser, the heating system including a passive doser heat exchanger configured to withdraw heat from exhaust gasses passing through the exhaust aftertreatment system and heat passageways through the doser, an active doser heating element configured to produce heat from electrical energy supplied to the heating system and heat passageways through the doser, and a heating system controller configured to selectively apply heat from the active doser heating element to manage the temperature of the ammonia solution moving in passageways through the doser,
wherein the heating system includes an active reservoir heating element configured to produce heat from electrical energy supplied to the heating system and heat contents of the ammonium carbamate reservoir, and wherein the heating system controller configured to selectively apply heat from the active reactor heating element to manage the temperature within the ammonium carbamate reservoir to maintain equilibrium of stored aqueous ammonium carbamate solution.

9. The system of claim 8, wherein the heating system includes a passive reservoir heat exchanger configured to withdraw heat from exhaust gasses passing through the exhaust aftertreatment system and heat contents of the ammonium carbamate reservoir, and wherein the heating system controller is configured to selectively modulate heat from the passive reservoir heat exchanger to control the temperature within the ammonium carbamate reservoir to maintain equilibrium of stored aqueous ammonium carbamate solution.

10. A vehicle comprising
a combustion engine configured to generate exhaust gases, and
an exhaust aftertreatment system configured to treat the exhaust gases, the exhaust aftertreatment system including
a diesel emission fluid reservoir,
a reactor for generating an ammonia solution from diesel emission fluid in the diesel emission fluid reservoir,
a doser configured to discharge controlled amounts of the ammonia solution into an exhaust stream moving through the exhaust gas aftertreatment system, and
a heating system configured to manage temperatures within the doser, the heating system including a passive doser heat exchanger configured to withdraw heat from exhaust gasses passing through the exhaust aftertreatment system and heat passageways through the doser, an active doser heating element configured to produce heat from electrical energy supplied to the heating system and heat passageways through the doser, and a heating system controller configured to selectively apply heat from the active doser heating element to manage the temperature of the ammonia solution moving in passageways through the doser,
wherein the reactor includes a relief valve in fluid communication with the diesel emission fluid reservoir and configured to allow the removal of diesel emission fluid from the reactor to the diesel emission fluid reservoir.

* * * * *